3,024,120
GLASS COLORANT COMPOSITIONS
Clarence L. Babcock, Toledo, Ohio, assignor to Owens-Illinois Glass Company, a corporation of Ohio
No Drawing. Filed Jan. 14, 1960, Ser. No. 2,339
9 Claims. (Cl. 106—52)

The present invention relates to a colorant enriched glass frit, and more particularly to such a frit containing a high concentration of chromium oxides.

In the earlier filed co-pending application of Erwin C. Hagedorn, Serial No. 572,978, filed March 21, 1956, now abandoned, and assigned to the assignee of the present invention, there are disclosed highly enriched colorant frits for addition to a colorless base glass to form a composite colored glass. The therein disclosed frits contain chromium oxides in amounts up to about 2% by weight of the total composition.

In the earlier filed co-pending application of Arthur B. Swain, Serial No. 804,142, filed April 6, 1959, now Patent No. 2,923,636, and assigned to the assignee of the present invention, there are disclosed additional frit compositions containing chromium oxides in amounts up to 1.5%. The frits of this Swain application contain residual hexavalent chromium oxide and are particularly effective when added to previously decolorized molten base glasses containing selenium.

These earlier Hagedorn and Swain compositions were "highly colorant enriched," since it became possible for the first time to make forehearth additions of colorants at base glass-to-frit addition ratios on the order of from 100-to-1 to 40-to-1 in order to obtain colored glasses meeting rigid color specifications.

It has now been found possible to incorporate substantially greater amounts of chromium oxides into specific frit compositions disclosed and claimed herein and containing more than 2 weight percent and as much as 7 percent or more chromium oxides.

A specific and unusual utility of frit compositions containing from more than 2% chromium oxides resides in the possibility of either (1) making feasible the manufacture of glasses of relatively dark color, such as emerald green or champagne green, by the forehearth addition of a highly colorant enriched frit to a base glass or (2) making lighter colors, such as rum green or Georgia green by the addition of less frit at the forehearth.

For practical reasons, chiefly because of excessive heat losses in the forehearth upon the addition of the cold frit to the molten colorless glass stream and also because of the difficulty of incorporating and uniformly dispersing large amounts of the frit to form a homogeneous composite glass within the length of the forehearth channel and further to avoid deleteriously affecting the overall composite glass composition, the amount of frit added should be kept within the range of from 1 to 2.5% by weight of the molten glass to which it is added. To physically incorporate sufficient chromium oxides and other coloring oxides into a colorless base glass so as to obtain a relatively dark emerald green or champagne green color, an amount of frit prepared as taught by the above identified earlier filed applications of Hagedorn and Swain would be impossible.

Thus, the more highly enriched, high-colorant-concentration frits of the present invention make possible the formation of heretofore unobtainable composite glasses by the highly desirable technique of forehearth addition.

The frit compositions of the present invention are also unique in that they consist essentially of silica, alkali metal oxides (either $K_2O$ or $Na_2O$) and $B_2O_3$ plus colorants, primarily chromium oxides. No more than 5% alkaline earth metal oxides (either CaO or BaO) are included, several of the compositions herein proposed containing no alkaline earth metal oxides. Such compositions can accommodate, without recrystallization, more than 2% chromium oxides. Thus, the compositions of the invention contain more than 2% chromium oxides in the vitreous state.

It is, therefore, an important object of the present invention to provide a colorant enriched frit for addition to a molten colorless base glass, the frit containing an amount of colorant heretofore unobtainable.

Another important object of the present invention is the provision of a frit composition containing no more than about 5% alkaline earth metal oxides, and containing more than 2% chromium oxide and up to about 7% chromium oxide or more.

Yet another important object of the present invention is the provision of a frit composition containing silica, alkali metal oxides (either $K_2O$ or $Na_2O$), $B_2O_3$, over 2% chromium oxide and no more than 5% alkaline earth metal oxides.

Other and further objects of this invention will become apparent from the following description:

PREPARATION OF BASE GLASS

The base glass usually colored with the frit glasses of the present invention is essentially a conventional glass of the type commonly utilized in the manufacture of colorless or "milk-bottle pink" containers. The oxides and the ranges of percentages thereof fall within the following ranges.

*Table I*

| Oxide: | Percent by weight |
|---|---|
| $SiO_2$ | 60 to 75 |
| $Al_2O_3$ | 0.3 to 10 |
| CaO+MgO | 6 to 15 |
| $Na_2O$ | 12 to 18 |
| $K_2O$ | .0 to 5 |
| BaO | .0 to 5 |
| Se | 0.00025 to 0.00035 |

The following Examples I and II are soda-lime flint batches which can be used in making the molten base (clear) glass useful for coloring with the frits of the present invention:

*Table II*

| | Example I | Example II |
|---|---|---|
| | Percent | Percent |
| $SiO_2$ | 72.01 | 71.45 |
| $Al_2O_3$ | 1.74 | 1.32 |
| $Fe_2O_3$ | .039 | .037 |
| $TiO_2$ | .029 | .013 |
| CaO | 11.38 | 8.32 |
| MgO | 1.15 | 5.58 |
| Alkalies | 13.65 | 13.28 |
| Selenium | 0.00025–0.00030 | 0.00025–0.00035 |

The conditions and procedures for making such molten base glasses are conventional and such conditions are well known to those skilled in the art, as exemplified in Table IX, B–11, on page 245 of "Handbook of Glass Manufacture," by Tooley, Ogden Publishing Co., New York, N.Y., 1953.

Generally the base glass issues from the melting tank or refiner and enters the forehearth at a temperature of from about 2300° F. to about 2600° F., and this temperature is well adapted for the addition of the frit which is in finely divided form, e.g., of from −8 to +30 mesh. In some instances, it was found that frit dispersion was enhanced by increasing the forehearth temperatures at the point of addition. For example, a melter tank temperature of 2280° F. may be increased to a temperature of 2350° F. at the forehearth addition point and the temperatures thereafter diminished along the length of the forehearth to a forehearth outlet temperature of 2070° F. A forehearth suitable for such operation is fully disclosed in the copending application of Rough and Swain, Serial No. 578,632, filed April 17, 1956, assigned to the assignee of the present invention.

It will be noted that the base glass compositions each contain selenium, as is common in colorless or "pink" flint glass compositions, and ferrous ($Fe^{++}$) iron as an impurity although the indicated analysis lumps all the iron content as calculated $Fe_2O_3$. The FeO content, usually introduced as a sand impurity, is limited to less than about 0.02% by weight as a quality control measure.

As indicated in the disclosure in said application, the frit composition is prepared by melting in a separate unit melter or day tank in which the frit composition is melted under oxidizing fining conditions (oxidizing atmosphere in melter), such melt being carried on so that the glass temperature of the melted frit is in the range 2700–2780° F. The melted colorant frit is fed as a molten stream from an outlet from the melter and chilled rapidly, such as by feeding it into a body of water, so that the frit breaks up into granulated form.

DESIRED FINAL GLASS OPTICAL PROPERTIES

In the manufacture of colored glasses, and particularly green glasses, certain specified color standards must be met. Such standards are usually defined in terms of "purity," "dominant wave length" and "brightness."

The "purity" of the glass as used herein specifies that percentage of the light transmitted that is within the dominant wave length range for a particular glass color. The glass absorbs the remaining light of that wave length. For example, using a Georgia green glass of commercially acceptable specification, light of the wave length 515–545 millimicrons is the "dominant wave length" range of the light of that color and if "purity" is indicated as 5%, this means 5% of the light within that dominant wave length range is being transmitted by the glass. The remaining 95% of that wave length is absorbed by the glass.

"Brightness," on the other hand, as referred to herein, is stated as a percentage of total light transmission by the glass. If Georgia green glass has a 75% "brightness" characteristic, it transmits 75% of the light of all wave lengths.

*Table I*

INDUSTRY OPTICAL STANDARDS FOR COMPOSITE GLASSES

Georgia green:
- Dominant wave length _____ mu __ 515 to 545
- Purity _____ percent __ 2.0 to 5
- Brightness _____ do ____ 70 to 80

Rum green:
- Dominant wave length _____ mu __ 542 to 555
- Purity _____ percent __ 6 to 8
- Brightness _____ do ____ 67 to 70

Emerald green:
- Dominant wave length _____ mu __ 550 to 562
- Purity _____ percent __ 55 to 80
- Brightness _____ do ____ 26 to 42

Champagne green: No industry standards.

*Table II*

COLORING CONSTITUENTS OF COMPOSITE GLASSES

Normal Georgia green:
- Total iron _____ 0.04 to 0.06% (as $Fe_2O_3$).
- $Cr_2O_3$ _____ 0.015 to 0.021%.
- $CrO_3$ _____ None.
- CoO _____ 0.0009 to 0.0011%.

Normal rum green:
- Total iron _____ 0.05 to 0.07 (as $Fe_2O_3$).
- $Cr_2O_3$ _____ 0.031%.
- $CrO_3$ _____ None.
- CoO _____ 0.0013%.

Normal emerald green:
- Total iron _____ 0.175 to 0.250% (as $Fe_2O_3$).
- $Cr_2O_3$ _____ 0.16 to 0.24%.
- $CrO_3$ _____ None.
- CoO _____ Do.

Normal champagne green:
- Total iron _____ 0.07 to 0.09% (as $Fe_2O_3$).
- $Cr_2O_3$ _____ 0.07 to 0.09%.
- $CrO_3$ _____ None.
- NiO _____ 0.06%.
- CoO _____ 0.004%.

ULTRA-VIOLET ABSORBENT GLASSES

Georgia green:
- $Fe_2O_3$ _____ 0.054%.
- Total chromium _____ 0.021 (as $Cr_2O_3$).
- $CrO_3$ _____ Trace.
- CoO _____ 0.0009.
- FeO _____ None.

Rum green:
- $Fe_2O_3$ _____ 0.070%.
- Total chromium _____ 0.037% (as $Cr_2O_3$).
- $CrO_3$ _____ Trace to 0.001%.
- CoO _____ 0.0013%.
- FeO _____ None.

Emerald green:
- $Fe_2O_3$ _____ 0.093 to 0.125.
- Total chromium _____ 0.140 to 0.17% (as $Cr_2O_3$).
- $CrO_3$ _____ Trace to .02%.
- FeO _____ None.
- CoO _____ 0.002 to .006%.

Champagne green:
- $Fe_2O_3$ _____ 0.05 to 0.08%.
- Total chromium _____ .06 to .1% (as $Cr_2O_3$).
- $CrO_3$ _____ Trace to 0.02%.
- FeO _____ None.
- CoO _____ .004 to .013%.
- NiO _____ .04 to .06%.

The following frit compositions 1 through 20 are capable of forming composite glasses falling within the above specified types. The specific glass formed is dependent upon the coloring ingredients present in the frit, such coloring ingredients including the oxides of iron, chromium, nickel, and cobalt.

FRIT COMPOSITIONS

*Table III*

FRIT COMPOSITIONS FOR MAKING EMERALD GREEN ULTRA-VIOLET ABSORBENT COMPOSITE GLASSES

| Ingredient | Theoretical compositions, percent by weight | | | |
|---|---|---|---|---|
| | 1 | 2 | 3 | 4 |
| $SiO_2$ | 67.18 | 66.18 | 69.12 | 68.79 |
| $Na_2O$ | 17.92 | 17.65 | 18.43 | 18.34 |
| $B_2O_3$ | 4.48 | 4.42 | 4.61 | 4.59 |
| $K_2O$ | 3.89 | 4.37 | 1.48 | 1.62 |
| $Fe_2O_3$ | | | 1.50 | 1.64 |
| $Cr_2O_3$ | 6.27 | 7.06 | 4.61 | 5.04 |
| CoO | 0.26 | 0.32 | 0.25 | |
| Actual analyzed total chromium content (as $Cr_2O_3$) | 6.14 | 7.00 | 4.66 | 5.03 |
| $CrO_3$ by analysis | N.D. | N.D. | 1.61 | N.D. |

Table IV
FRIT COMPOSITIONS FOR MAKING CHAMPAGNE GREEN ULTRA-VIOLET ABSORBENT COMPOSITE GLASSES

| Ingredient | Theoretical compositions percent by weight | | |
|---|---|---|---|
| | 5 | 6 | 7 |
| $SiO_2$ | 59.42 | 60.79 | 63.31 |
| $Na_2O$ | 20.00 | 20.00 | 20.00 |
| $B_2O_3$ | 5.00 | 5.00 | 5.00 |
| $K_2O$ | 4.15 | 3.71 | 1.54 |
| $Fe_2O_3$ | | | 1.56 |
| $Cr_2O_3$ | 6.00 | 5.50 | 4.50 |
| NiO | 4.50 | 4.13 | 3.38 |
| CoO | .93 | .87 | .71 |
| Actual analyzed total chromium content (as $Cr_2O_3$) | 6.42 | 5.81 | 4.83 |

Table V
EFFECT OF VARYING $Na_2O$, $K_2O$, AND $B_2O_3$ CONTENTS

| Ingredient | Percent by weight | | |
|---|---|---|---|
| | 8 | 9 | 10 |
| $SiO_2$ | 69.38 | 61.89 | 68.36 |
| $Na_2O$ | 4.63 | | 18.23 |
| $B_2O_3$ | 1.43 | 4.14 | 4.56 |
| $K_2O$ | 18.50 | 26.8 | 1.69 |
| $Fe_2O_3$ | 1.43 | 1.70 | 1.69 |
| $Cr_2O_3$ | 4.63 | 5.47 | 5.47 |
| Actual analyzed total Chromium content (as $Cr_2O_3$) | 4.74 | 5.09 | 5.20 |
| $CrO_3$ by analysis | 1.73 | N.D. | 1.91 |

Table VI
EFFECT OF CaO AND BaO CONTENT

| Ingredient | Percent by weight | | | | |
|---|---|---|---|---|---|
| | 11 | 12 | 13 | 14 | 15 |
| $SiO_2$ | 64.77 | 62.79 | 69.38 | 65.76 | 66.40 |
| $Na_2O$ | | | 18.50 | 17.68 | 17.70 |
| $K_2O$ | 27.17 | 26.91 | 1.43 | 3.20 | 4.39 |
| $B_2O_3$ | | | | 2.09 | 4.43 |
| BaO | | 4.25 | 4.63 | 1.87 | |
| CaO | 4.31 | | | 1.98 | |
| $Fe_2O_3$ | 0.89 | 1.43 | 1.43 | 0.93 | |
| CoO | | | | 0.26 | |
| $Cr_2O_3$ | 2.86 | 4.62 | 4.63 | 6.23 | 7.08 |
| Actual analyzed total chromium (as $Cr_2O_3$) | 2.59 | 4.05 | 4.43 | | 6.92 |
| $CrO_3$ by analysis | N.D. | N.D. | N.D. | N.D. | 3.05 |

Table VII

| Ingredient | Percent by weight | | | | |
|---|---|---|---|---|---|
| | 16 | 17 | 18 | 19 | 20 |
| $SiO_2$ | 71.52 | 68.04 | 60.97 | 60.56 | 67.36 |
| $Na_2O$ | 19.09 | 18.14 | | | 17.96 |
| $K_2O$ | 0.89 | 1.96 | 26.68 | 25.90 | 3.90 |
| $B_2O_3$ | | | | 2.84 | 4.49 |
| BaO | | 4.54 | 4.12 | 3.02 | |
| CaO | 4.77 | | | | |
| $Fe_2O_3$ | 0.89 | 1.96 | 1.94 | 1.93 | |
| CoO | | | | 0.23 | |
| $Cr_2O_3$ | 2.86 | 5.36 | 6.29 | 5.52 | 6.29 |
| Actual analyzed total chromium (as $Cr_2O_3$) | 2.78 | 5.36 | 5.44 | | 6.24 |
| $CrO_3$ by analysis | N.D. | N.D. | N.D. | N.D. | 2.73 |

The chromium oxide is specified in each frit example as "$Cr_2O_3$" and is a measure of the total chromium oxide content. Preferably at least a part of the specified "$Cr_2O_3$" content of the frit is in the form of hexavalent chromium (as $CrO_3$). The actual $CrO_3$ content of any given frit is dependent upon two factors, namely (1) the addition of the chromium to the frit batch as potassium dichromate and (2) the oxidation state of the frit batch during melting. In certain examples, e.g., Examples 1, 5 and 6, all of the chromium was added as dichromate. In certain other examples, e.g., Examples 3, 16 and 17, the chromium was added as equal parts by weight chromite (a mineral containing $FeO \cdot Cr_2O_3$) and potassium dichromate. In the manufacture of ultra-violet absorbent composite glasses a residual hexavalent chromium content is desired and an oxidizing agent such as niter is preferably added to maintain strongly oxidizing conditions in the frit batch. A full discussion of the $Cr_2O_3$–$CrO_3$ relation is to be found in the copending application of A. B. Swain, Serial No. 804,142, now Patent No. 2,923,636, filed April 6, 1959, and assigned to the assignee of the present invention.

SUMMARY

To summarize the compositions herein set forth, they may be defined somewhat generically as follows.

Table VIII

| Ingredient: | Percent by weight |
|---|---|
| $SiO_2$ | 55–75 |
| $R_2O$ | 15–30 |
| $B_2O_3$ | 0–20 |
| MO | 0–5 |
| Chromium oxides | Over 2 |
| $Fe_2O_3$ | 0–2 |
| CoO | 0–1 |
| NiO | 0–5 |

More specifically, the compositions fall within the following range of specific ingredients.

Table IX

| Ingredient: | Percent by weight |
|---|---|
| $SiO_2$ | 55–75 |
| $Na_2O$ | 0–20 |
| $K_2O$ | 0–30 |
| $B_2O_3$ | 0–20 |
| CaO | 0–5 |
| BaO | 0–5 |
| Chromium oxides | Over 2 |
| CoO | 0–1 |
| NiO | 0–5 |
| $Fe_2O_3$ | 0–2 |
| $R_2O$ total | 15–30 |
| MO total | 0–5 |

Although any amount of $B_2O_3$ is beneficial, a particularly effective class of compositions of the invention contain the following ingredients in the amounts indicated.

Table X

| Ingredient: | Percent by weight |
|---|---|
| $SiO_2$ | 58–70 |
| $R_2O$ | 19–26 |
| $B_2O_3$ | 1–20 |
| MO | 0–5 |
| Chromium oxide | Over 3 |
| $Fe_2O_3$ | 0–2 |
| CoO | 0–1 |
| NiO | 0–5 |
| Total of $R_2O + B_2O_3$ | At least 23 |

In the foregoing tables, R is an alkali metal selected from sodium or potassium or mixtures thereof and M is an alkaline earth metal selected from calcium and barium and mixtures thereof.

The embodiments of the invention in which an exclusive property or privilege is claimed, are defined as follows.

I claim:
1. A colorant enriched glass frit suitable for use in coloring a base glass consisting essentially of the following ingredients in the indicated percentages by weight:

| Ingredient— | Percent by weight |
|---|---|
| $SiO_2$ | 55–75 |
| $R_2O$ | 15–30 |
| $B_2O_3$ | 0–20 |
| MO | 0–5 |
| Chromium oxides | Over 2 |
| $Fe_2O_3$ | 0–2 |
| CoO | 0–1 |
| NiO | 0–5 | wherein R is an alkali metal selected from the group consisting of sodium and potassium and mixtures thereof, and M is an alkaline earth metal selected from the group consisting of calcium and barium and mixtures thereof, said chromium oxides being present in the vitreous state.

2. A colorant enriched glass frit suitable for use in coloring a base glass consisting essentially of silica, not more than 5% by weight total alkaline earth metal oxide, from 0 to 20% by weight $B_2O_3$, from 15 to 30% by weight of alkali metal oxide selected from the group consisting of $K_2O$ and $Na_2O$ and mixtures thereof, and more than 2% by weight chromium oxide, said chromium oxide being present in the vitreous state.

3. A colorant enriched glass frit suitable for use in coloring a base glass consisting essentially of silica, from 15 to 30% by weight of alkali metal oxide selected from the group consisting of $K_2O$ and $Na_2O$ and mixtures thereof, more than 2% by weight chromium oxide, and an additional colorant material selected from the group consisting of iron oxide, cobalt oxide, nickel oxide and mixtures thereof, said chromium oxide being present in the vitreous state.

4. A colorant enriched glass frit suitable for use in coloring a base glass consisting essentially of the following ingredients in the indicated percentages by weight:

| Ingredient— | Percent by weight |
|---|---|
| $SiO_2$ | 55–75 |
| $R_2O$ | 15–30 |
| Chromium oxides | Over 2 |
| $Fe_2O_3$ | 0–2 |
| CoO | 0–1 |
| NiO | 0–5 | wherein R is an alkali metal selected from the group consisting of sodium and potassium and mixtures thereof, said chromium oxides being present in the vitreous state.

5. A highly colored glass frit composition containing colorant oxides and being capable of containing over 2% and up to 7% by weight chromium oxide without recrystallization, said frit ingredients other than colorant oxides consisting essential of silica, not more than 5% by weight alkaline earth metal oxide, from 0–20% by weight $B_2O_3$ and from 15 to 30% by weight of alkali metal oxide selected from the group consisting of $K_2O$, $Na_2O$ and mixtures thereof.

6. A colorant enriched glass frit suitable for use in coloring a base glass composition containing the following ingredients in the indicated percentages by weight:

| Ingredient— | Percent by weight |
|---|---|
| $SiO_2$ | 58–70 |
| $R_2O$ | 19–26 |
| $B_2O_3$ | 1–20 |
| MO | 0–5 |
| Chromium oxides | Over 3 |
| $Fe_2O_3$ | 0–2 |
| CoO | 0–1 |
| NiO | 0–5 |
| Total of $R_2O+B_2O_3$ | At least 23 | wherein R is an alkali metal selected from the group consisting of sodium and potassium and mixtures thereof, and M is an alkaline earth metal selected from the group consisting of calcium and barium and mixtures thereof, said chromium oxides being present in the vitreous state.

7. A colorant enriched glass suitable for use in coloring a base glass consisting essentially of the following ingredients in the indicated percentages by weight:

| Ingredient— | Percent by weight |
|---|---|
| $SiO_2$ | 55–75 |
| $R_2O$ | 15–30 |
| $B_2O_3$ | 0–20 |
| MO | 0–5 |
| Chromium oxides | Over 2 to about 7 |
| $Fe_2O_3$ | 0–2 |
| CoO | 0–1 |
| NiO | 0–5 | wherein R is an alkali metal selected from the group consisting of sodium and potassium and mixtures thereof, and M is an alkaline earth metal selected from the group consisting of calcium and barium and mixtures thereof.

8. A colorant enriched glass suitable for use in coloring a base glass consisting essentially of silica, not more than 5% by weight total alkaline earth metal oxide, from 0 to 20% by weight $B_2O_3$, from 15 to 30% by weight of alkali metal oxide selected from the group consisting of $K_2O$ and $Na_2O$ and mixtures thereof, and from more than 2% up to about 7% by weight chromium oxide.

9. A colorant enriched glass suitable for use in coloring a base glass composition containing the following ingredients in the indicated percentages by weight:

| Ingredient— | Percent by weight |
|---|---|
| $SiO_2$ | 58–70 |
| $R_2O$ | 19–26 |
| $B_2O_3$ | 1–20 |
| MO | 0–5 |
| Chromium oxides | Over 3 to about 7 |
| $Fe_2O_3$ | 0–2 |
| CoO | 0–1 |
| NiO | 0–5 |
| Total of $R_2O+B_2O_3$ | At least 23 | wherein R is an alkali metal selected from the group consisting of sodium and potassium and mixtures thereof, and M is an alkaline earth metal selected from the group consisting of calcium and barium and mixtures thereof.

References Cited in the file of this patent

UNITED STATES PATENTS

| 2,916,387 | Commons | Dec. 8, 1959 |
| 2,923,636 | Swain | Feb. 2, 1960 |